Feb. 23, 1926.　　　　　　1,573,966
J. G. JONES
CULTIVATOR
Filed July 14, 1924
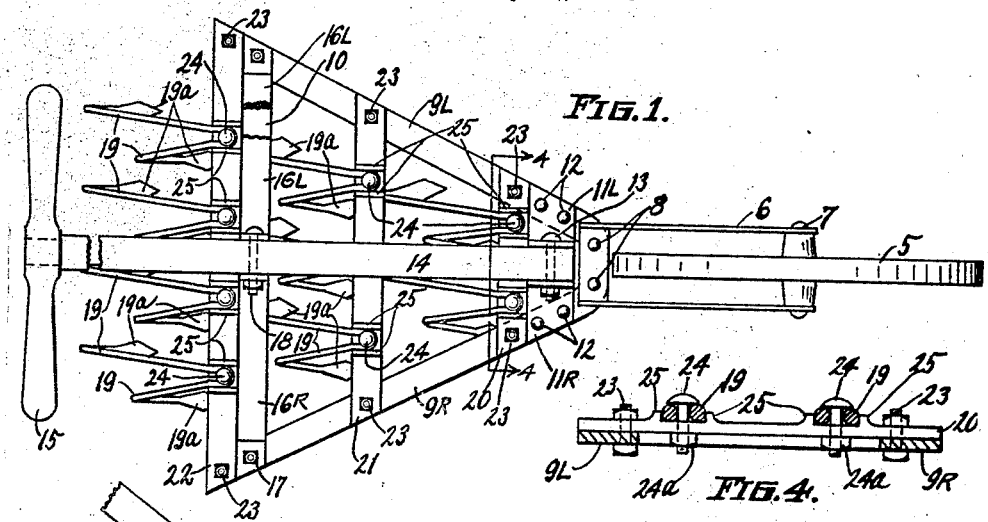
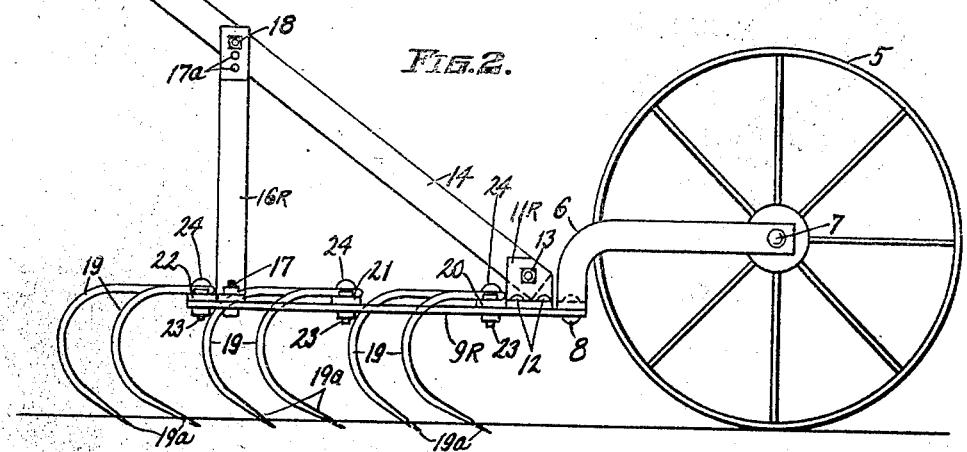
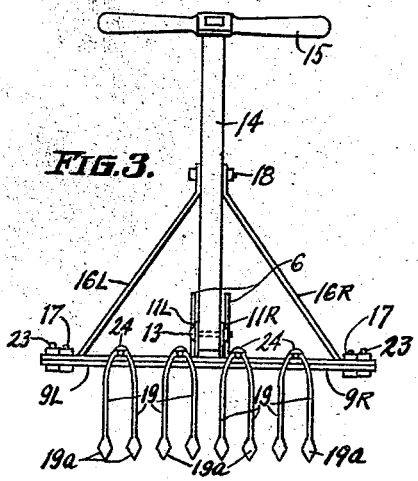
INVENTOR:
John G. Jones
BY A. M. Carlsen
ATTORNEY.

Patented Feb. 23, 1926.

1,573,966

UNITED STATES PATENT OFFICE.

JOHN G. JONES, OF MARINE ON ST. CROIX, MINNESOTA.

CULTIVATOR.

Application filed July 14, 1924. Serial No. 725,787.

*To all whom it may concern:*

Be it known that I, JOHN G. JONES, a citizen of the United States, residing at Marine on St. Croix, in the county of Washington and State of Minnesota, have invented certain new and useful Improvements in Cultivators, of which the following is a specification.

My invention relates to cultivators in general and more particularly a cultivator of the type most adaptable for gardens and small farms and pushed ahead of the operator while working the soil between rows of plants.

The object of the invention is to provide a simple, efficient and inexpensive cultivator of such construction that more cultivating can be done with less effort than has hitherto been possible, as hereinafter described and illustrated in the accompanying drawing, in which:—

Fig. 1 is a top or plan view of my improved cultivator.

Fig. 2 is a side elevation of Fig. 1, the handle 15 being omitted.

Fig. 3 is a rear elevation of the device in reduced scale.

Fig. 4 is an enlarged sectional detail as on line 4—4 in Fig. 1 showing the alignment means for the shanks of the cultivator shovels.

Referring to the drawing by reference numerals, it will first be understood that my device is the "walking" type cultivator in the use of which the operator walks between the rows of plants pushing the cultivator ahead of him, the front end of the device being supported on a single ground wheel 5. 6 is a horizontally disposed fork the front ends of which are connected by the axle 7 of the ground wheel and the rear end secured at 8 to the forward end of a horizontally disposed main frame. The latter is preferably made of flat bar stock and in the form of an isosceles triangle, the equal sides or arms $9^R$ and $9^L$ being integral and spread apart rearwardly. The third or rear side of the triangular frame is simply a transverse bar 10 connecting the rear ends of the side bars $9^R$—$9^L$ (Fig. 1).

$11^R$ and $11^L$ are two angle iron clips secured as at 12 to the forward parts of the frame arms $9^R$—$9^L$ respectively and having their upright arms spaced apart and bored for a bolt 13 which engages and clamps the forward end of a push bar 14. Said bar extends rearwardly and upwardly and has a horizontal T-handle 15 at its rear end, and is held in said angular position by two angular braces $16^R$ and $16^L$ secured with their lower ends as at 17 on the main frame. The upper ends of the braces have each a vertical part with a row of holes $17^a$ registering with the holes in the opposite bar and a bolt 18 is provided to be passed through any pair of such holes and the push bar 14 to hold the latter in any desired inclined position.

The cultivator shovels I employ are preferably of the kind common to the small garden hand-operated cultivators the shovels made in pairs, each pair of a piece of bar stock 19, the shovel portion $19^a$ being formed by flattening and pointing the two ends thereof as best shown in Figs. 1 and 3. The shanks of each pair of shovels are bent in an upward and forward curvature from each shovel, one shorter than the other so that one shovel in each pair is forward of the other. The two shank arms are of course the same one piece of bar stock brought gradually together forwardly and the bar made U-shape at the front end, said U-shaped portion on longitudinally spaced cross bars 20—21 and 22 detachably secured as at 23 to the main frame bars $9^R$ and $9^L$. Said bars 20—21—22 are respectively the front, middle and rear bars, best shown in Fig. 1, and each of them is provided with a predetermined number of spaced holes for round-headed bolts 24 each of which is adapted to engage the U-part of one pair of cultivator shovels and clamp said part to the bar with a nut $24^a$. The cross bars are of course one longer than the other in their numbered rotation and carry a proportionate number of shovels, but the spacing of the cultivator shovels on the cross bars is so arranged that the shovels are in transverse, staggered relation to each other so as to thoroughly cultivate a path as wide as the distance between the extreme right and left shovels of the longest bar 23.

In the operation of the device the operator grasps the handle 15, one hand on each side of bar 14 and pushes the device forward between the rows of plants. The forward end of the device is of course carried by the ground wheel but to regulate the depth the cultivator shovels are most effective, the operator simply holds the handle 15 at the necessary height while moving forward. A particularly desirable feature is that the operator's hands are close together and his arms extend forwardly directly from his shoulders resulting in a maximum application of power. In some types of small agricultural implements for the same purposes two widely separated handles are provided, the use of which cause considerable side strain on the arms of the operator resulting in less effective forward pushing and greater fatigue. The centralized or concentrated forward application of power through the handle 15 and bar 14 I have found to be of great advantage and enables the cultivating of a wide path to be accomplished with comparatively small effort.

In Figs. 1 and 4 I have shown that the bars 20, 21 and 22 may have projecting pairs of parallel ribs 25, one rib on each side of a bolt 24 and each pair of such ribs spaced so as to engage the outer sides of the U-shaped shank portion of the shovel bars 19 to hold each pair of shovels rigidly in their proper position. It is readily understood that the number of cultivator shovel-carrying bars as 20—21—22 may be varied according to soil conditions, etc. Any of said bars is readily removable with all all of its shovels or any of the pairs of shovels may be removed at any time for sharpening, repairs or replacement.

When the cultivator is to be taken away from a field the operator simply turns it upside down and pushes the device in the same manner as previously described except that the shovels will be above the main frame.

What I claim is:

In a cultivator, the combination with a frame adapted to be drawn over the ground and having transverse horizontal bars with pairs of integral ribs across their tops, of cultivator teeth formed in pairs, one tooth at each end of a metal bar, said bar having intermediate its ends an approximately U-shaped bend with a bolt through it and the frame bar to secure it thereto between a pair of the ribs.

In testimony whereof I affix my signature.

JOHN G. JONES.